Nov. 12, 1957

D. SCIAKY ET AL 2,813,199

SEQUENCE TIMER

Filed Sept. 2, 1953

INVENTORS
David Sciaky and
Julius L. Solomon,
BY
Wilkinson Huxley Byron & Hume
Attys

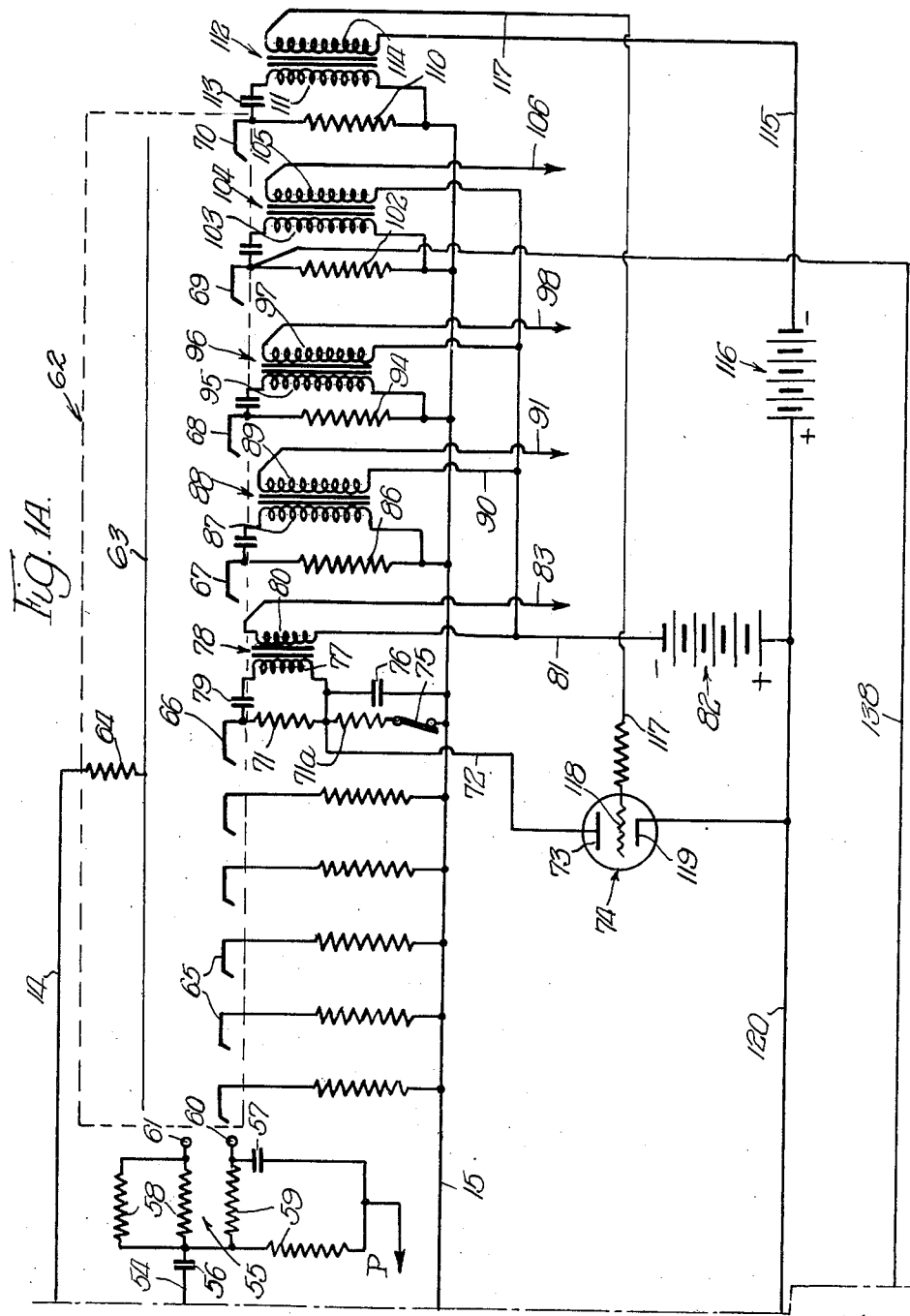

Nov. 12, 1957 D. SCIAKY ET AL 2,813,199
SEQUENCE TIMER
Filed Sept. 2, 1953 4 Sheets-Sheet 3

VOLTAGE WAVEFORM ACROSS R.86
GIVING 8 CYCLE COUNT.

INVENTORS
David Sciaky
and Julius L. Solomon,
BY
Wilkinson Huxley Byron & Hume
attys

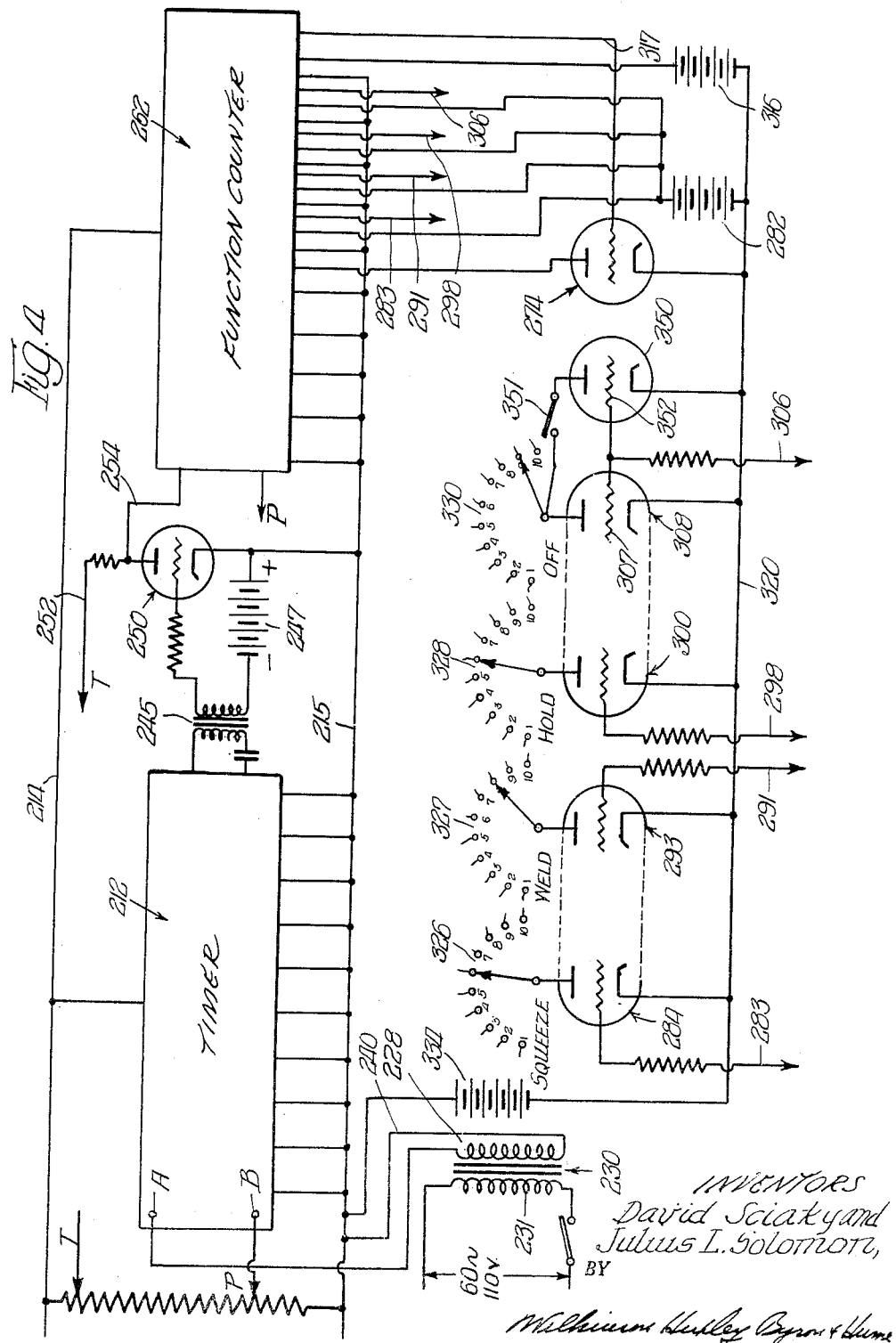

United States Patent Office 2,813,199
Patented Nov. 12, 1957

2,813,199

SEQUENCE TIMER

David Sciaky and Julius L. Solomon, Chicago, Ill., assignors to Welding Research, Inc., Chicago, Ill., a corporation of Illinois Application September 2, 1953, Serial No. 378,140

13 Claims. (Cl. 250—27)

The invention relates to an electronic timing system for the individual timing of a plurality of functions taking place in sequence and has reference in particular to a timing circuit employing electronic elements including a cold cathode glow transfer tube in combination with control means therefor for effecting a counting function.

An object of the invention is to provide an improved electronic counting circuit for timing a series of functions taking place in sequence and wherein said individual functions are timed by counting a predetermined number of electric pulses supplied by an electric current source. In the event the electric pulses are supplied by the conventional sixty cycle alternating current, then the present electronic circuit will operate to count the cycles thereof at the rate of sixty per second.

In the resistance welding of metals a plurality of operations are performed in sequence on the workpieces to be welded and to secure commercially acceptable welding performance it is essential that the operations be accurately timed. Accordingly, the workpieces are squeezed together to insure contact and the duration of the squeeze period is accurately measured. Then current flow takes place for welding the workpieces and this must also be timed for the particular metal being welded since different metals require different welding times. Following the welding it is desirable to hold the workpieces in contact until proper annealing of the weld has taken place and accordingly the timing circuit for timing welding operations must be able to time a number of operations taking place in sequence and automatically switch from one operation to the next. Heretofore it has been customary to employ timing elements equal in number to the operations to be timed. For example, four timing elements have been required for controlling the four different functions of a welding machine. However, only one timing element is included in the combination of the invention since it is preset in advance of each timing operation and the timing element can thus be employed for timing a number of different functions. The timing circuit of the present invention has been especially designed for timing the individual functions of a welding operation although its utility is of course not restricted thereto. A characteristic feature of the improved circuit resides in the employment of a cold cathode glow transfer tube as the counting element for the individual timing of each function and wherein means are combined therewith for presetting the counting element in advance of each timing function.

In view of the foregoing, an object of the invention is to provide an improved electronic circuit as described which will incorporate novel switch means for ending one timed function and beginning the next, with the switching taking place automatically and in a manner which makes possible the employment of only one counting element for timing all the operations.

A still further object of the invention is to provide an improved electronic counting circuit as described which will incorporate two or more counting elements with one operating as a timer and the others as a function counter, and wherein the timer is preset by electric means having electrical connection with the function counter so that each function or operation is individually timed.

Another object of the invention is to provide an electronic counting circuit employing a timer and a function counter as elements thereof and which operate in a manner whereby a voltage appears across the resistors in the cathode circuits of the function counter and which continues for a period of time, depending on the setting of the timer. The voltages may be applied to various elements of a welding machine, for example, to accurately time the several operations of the same and which are also controlled so as to take place in the sequence desired.

With these and various other objects in view, the invention may consist of certain novel features of construction and operation, as will be more fully described and particularly pointed out in the specification, drawings and claims appended hereto.

In the drawings which illustrate an embodiment of the device and wherein like reference characters are used to designate like parts—

Figure 1A is a wiring diagram illustrating schematically the remaining part of the present electronic counting circuit, the same comprising the function counter and associated elements;

Figure 4 is a view showing a modification of the electronic counting circuit of the invention, the timer and function counter being schematically shown in relation to exterior circuit elements.

Figure 1:
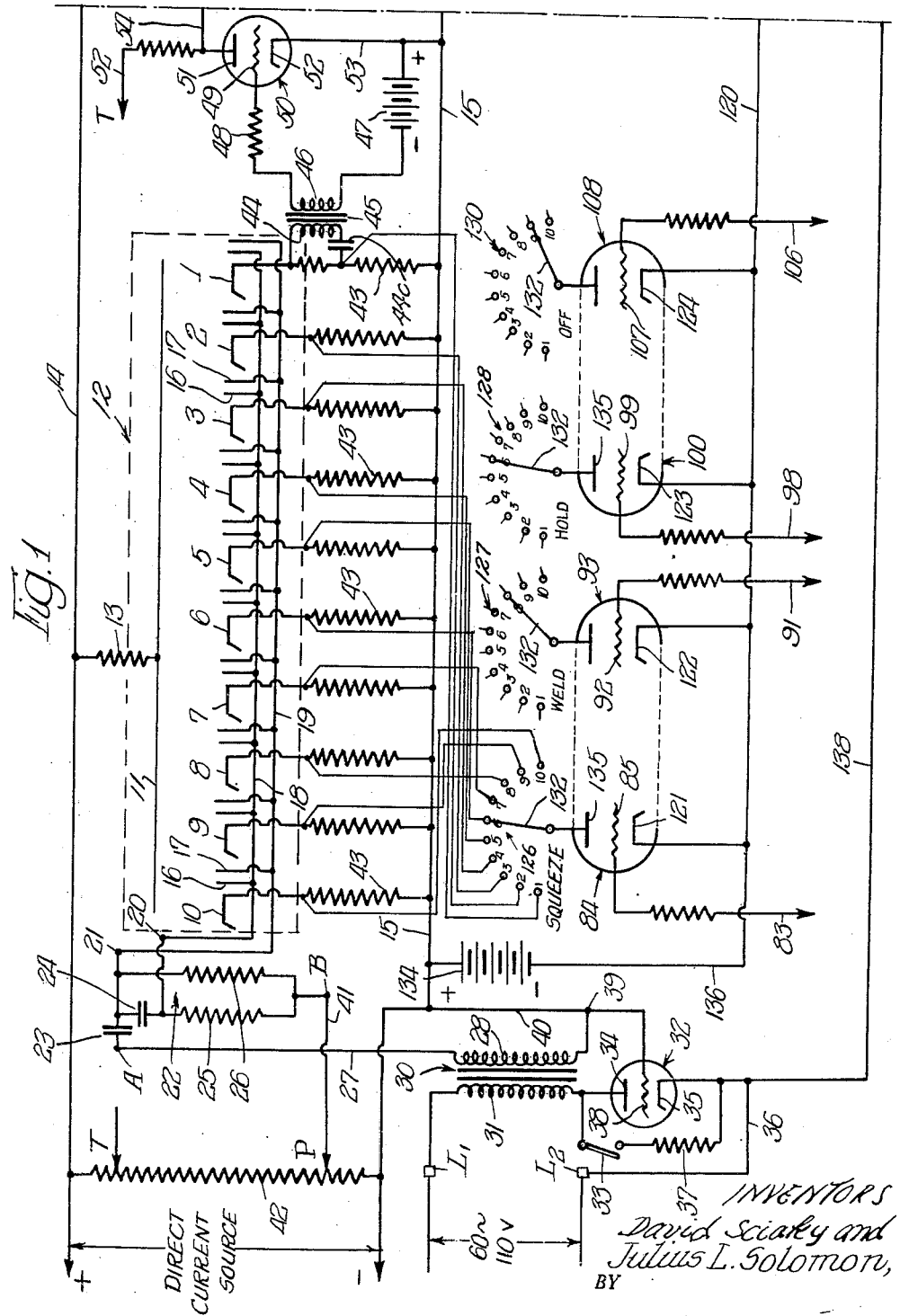
Figure 1 is a wiring diagram illustrating schematically part of the present electronic counting circuit, the same comprising the timing counter and the electronic elements for switching at the end of each timed function.

Referring to the drawings, Figure 1, there is schematically illustrated a cold cathode glow transfer tube of the type as employed by the present invention, the same including an anode and a plurality of cathode in associated relation with the anode, and having guide terminals located between the cathodes for progressing the glow from one cathode to the next. The counting element or tube, as shown in Figure 1, and which functions as a timer, is indicated generally by numeral 12, the same including the anode 11 and the cathodes 1 to 10 inclusive. The anode is connected through resistor 13 with conductor 14, having electrical connection to the positive terminal of a direct current source, the negative terminal thereof connecting with conductor 15 to which the cathodes 1 to 10 inclusive are electrically connected. For transferring the glow from one cathode to the next, or, in other words, to successively energize the cathodes the guides 16 and 17 are provided, the same being associated with each cathode. The conductors 18 and 19, respectively, connect the guides to the guide terminals 20 and 21. Accordingly, a current pulse applied to the terminal 20 will be supplied in turn to all of the guides 16 and in a similar manner a current pulse applied to terminal 21 will be supplied to all of the guides 17.

The current pulses to be counted by the counting element or tube 12 are applied to terminals A and B which have electrical connection with the guide terminals 20 and 21 through a phase shift circuit 22 consisting of condensers 23 and 24 and the series resistors 25 and 26. Terminal A is electrically connected through conductor 27 to the secondary winding 28 of transformer 30, said transformer having the primary winding 31 electrically connected to a source of conventional sixty cycle alternating current of one hundred and ten volts. The terminals of said alternating current source are indicated by the notations $L_1$ and $L_2$, there being interposed in connection with terminal $L_2$ an electric discharge valve 32 and a switch 33 for starting and stopping the supply of current pulses to the timer 12. The anode 34 of said valve 32 is electrically connected to one terminal of the primary winding 31. The cathode 35 of the valve 32 is electrically connected by conductor 36 to terminal $L_2$. The switch 33 is located in a bypass circuit which includes current limiting resistor 37, the circuit having connection with the anode 34 and the cathode 35 exteriorly of the tube and thus being connected in shunt relation across said tube. The control grid 38 is connected at 39 to one terminal of the secondary winding 28 and the grid is also connected through conductor 40 to conductor 15, connecting with the negative terminal of the direct current source. The point B of said phase shift circuit, previously described, is connected by conductor 41 to tap P on the voltage dividing resistor 42 which is connected across the direct current source.

The counting element or tube 12 is completed by the cathode resistors 43 interposed in the circuit of each cathode. When the cathodes are individually energized current flow takes place through resistor 43 thereof so that voltage is developed across the resistor, which voltage will continue as long as current flow takes place. With respect to cathode 1, that is, the last cathode of the timing element, the primary winding 44 of a transformer 45 is connected in shunt relation with a portion of the resistor 43 of said cathode. The transformer 45 is part of a coupling circuit so that the voltage developed across the resistor of cathode 1 upon energization of this cathode will be transmitted as an electric pulse to the next succeeding counter, all in a manner as will be clearly understood as the description proceeds.

The timer 12 of Figure 1 is energized by the direct current source which is impressed across the anode 11 and the cathodes of said timer, it being observed that the potential applied to the guides 16 and 17 is more positive than the potential applied to the cathodes, due to the position P of conductor 41 on the voltage resistor 42. When switch 33 is closed the alternating current source connecting with $L_1$ and $L_2$ supplies periodic current pulses to the primary winding 31. Similar current pulses are developed in winding 28 and which are supplied to the phase shift circuit 22 and thus eventually to the guide terminals 20 and 21. As a result of the phase shift circuit the current pulses appearing at terminals 20 and 21 are out of phase. For example, the phase shift circuit is such as to supply to the guide terminal 20 a leading current and to supply to guide terminal 21 a current which is in phase with the applied voltage or which may be lagging the applied voltage. Accordingly, each current pulse from the alternating current source is first indicated at guides 16 by a drop in the potential of said guides and after a time interval, depending on the characteristics of the phase shift circuit, said current pulse is indicated at guides 17 by a similar drop in potential.

Assuming that the timer 12 has been preset for a count 10, the said cathode 10 will therefore be energized at the start of a timing operation. A current pulse applied to terminals A and B will accordingly cause a potential drop first at the guides 16 and then at the guides 17 so that the glow is accordingly transferred from cathode 10 to guide 16, then to guide 17, and eventually to cathode 9 comprising a count of one current pulse. The next current pulse applied to points A and B will transfer the glow from cathode 9 to cathode 8 and for each current pulse thereafter the glow is transferred from one cathode to the next, effecting energization of each cathode in succession and a counting operation accordingly takes place. When the glow is at cathode 1 the current flow through the resistor 43 will charge the condenser 44c. For the tenth count the glow will have transferred from cathode 1 to cathode 10 and when the glow leaves the cathode, the condenser will discharge, thereby developing a signal voltage across the secondary winding 46 of transformer 45. In accordance with the invention this signal voltage produced by cathode 1 is transmitted as an electric pulse to the next counting element, which accordingly has operation as a function counter since each operation of the timer is therefore counted thereby.

Figure 1A schematically illustrates another cold cathode glow transfer tube 62 which serves as a function counter for the timer. A coupling circuit is employed for electrically connecting the last cathode, namely 1, of the timer, with the guide terminals of the function counter 62. The coupling circuit includes the secondary winding 46, Figure 1, of transformer 45, one terminal of which is electrically connected to the direct source shown as a battery 47, and the other terminal of which is connected through the current limiting resistor 48 to the control grid 49 of an electric discharge valve 50. The anode 51 of said electric discharge valve is connected through conductor 52 to a tap T located adjacent the positive terminal of the voltage dividing resistor 42. The cathode 53 of said valve has electrical connection by means of conductor 53 with the conductor 15 connecting with the negative terminal of the direct current source.

The battery 47 supplies a negative biasing potential to the grid 49, thereby maintaining the electrical discharge valve 50 in a non-conducting state. However, said valve is rendered conductive each time an electric pulse is supplied by the cathode 1 of the timer. Said pulse is transmitted by the coupling circuit to grid 49 driving the same positive and the valve is momentarily conductive. Accordingly, a pulse of current is delivered by conductor 54 to the phase shift circuit of the function counter, said circuit being generally designated by numeral 55 and including the condensers 56 and 57 and the resistors 58 and 59. The phase shift circuit has connection with the guide terminals 60 and 61, it being understood that said guide terminals connect with guides having location between the cathodes of the function counter, the structure and operation of which is basically similar to that of the timer 12 previously described.

The function counter includes an anode 63 having connection through resistor 64 with conductor 14, which in turn electrically connects with anode 11 of the timer and with the positive terminal of said direct current source. In a similar manner the negative terminal of said direct current source has connection through conductor 15 with the cathodes of the timer and with the cathodes of the function counter. In the illustrated embodiment five cathodes are operative although only four functions are counted and controlled by the function counter and, accordingly, the cathodes 65 are not operative. However, cathodes 66, 67, 68, 69 and 70 of the function counter are operative and in accordance with the present invention the energization of each cathode, due to the electric pulses supplied to the guide terminals 60 and 61, produces an energizing current which is supplied to electronic devices, respectively, for amplification and said energizing currents as thus amplified are operative for resetting the timer prior to the starting of another timing operation.

Referring to cathode 66, the resistor 71 in the cathode circuit thereof is tapped by the conductor 72 which has connection with the anode 73 of a grid controlled electric discharge valve 74. An electric switch 75 for starting and stopping the operation of the function counter is located in said cathode circuit in series relation with resistor 71a. The condenser 76 is connected across the switch 75 and resistor 71a and a second shunt circuit across resistor 71 includes the primary winding 77 of transformer 78, the said primary winding having the condenser 79 in series therewith. One terminal of secondary winding 80 is connected through conductor 81 to the negative terminal of the biasing potential in the form of the direct current battery 82. The other terminal of secondary winding 80 is connected through conductor 83 with the grid 85 of an electronic device in the form of a grid controlled electric discharge valve 84. Cathode 67 has a resistor 86 in the circuit thereof and the shunt circuit connected across the resistor includes the primary winding of transformer 88. The secondary winding 89 has one terminal thereof connected by conductor 90 to conductor 81 leading to the negative terminal of the biasing source 82. The other terminal of secondary winding 89 is connected by conductor 91 to the control grid 92 of its electronic device in the form of a grid controlled electric discharge valve 93. In a similar manner cathodes 68 and 69 have resistors in circuit therewith and each cathode is provided with transformer means, the secondary winding of which has electrical connection with the control grid of its respective electronic device. Conductor 98 for cathode 68 has electrical connection with the grid 99 of its electronic device 100, whereas conductor 106 for cathode 69 has electrical connection with the control grid 107 of its electronic device 108.

The circuit means above described in electrical association with the cathodes of timer 12 effects a resetting of the timer before it repeats its timing function. The resistor 110 in the circuit of the cathode 70 has a shunt circuit in electrical connection therewith, the same including the primary winding 111 of transformer 112 and the condenser 113. The secondary winding 114 of transformer 112 is connected by conductor 115 to the negative terminal of the direct current battery 116 providing a source of biasing potential. The other terminal of the secondary winding 114 is connected by conductor 117 to the grid 118 of the electric discharge device 74 previously described in connection with cathode 66. The cathode 119 of the electric discharge device 74 is connected to conductor 120 which joins with the positive terminals of batteries 82 and 116. Said conductor 120 also electrically connects with the cathodes 121 to 124 inclusive of the electric discharge devices 84, 93, 100 and 108.

As the electric pulses received by the function counter step the glow from cathodes 66 to 67 to 68 to 69, and eventually to cathode 70, the cathodes are energized in turn, resulting in current flow taking place in the cathode circuits. Accordingly, a voltage drop across the resistor in each cathode circuit is employed to produce a signal voltage which is transmitted by the electric circuit means including the transformers 78, 88, 96 and 104 to the grids of the electric discharge devices 84, 93, 100 and 108, which are in turn rendered conductive so as to render operative their particular dial switch member for presetting purposes. Upon energization of the cathode 70 and current flow in the cathode circuit thereof the voltage drop across resistor 110 produces a signal voltage which is transmitted by transformer 112 and the secondary winding thereof to the grid 118 of the electric discharge valve 74. The discharge valve 74 is normally held in non-conductive state by the battery 116 which maintains the grid 118 negative with respect to the cathode. As a result of the voltage pulse delivered to the grid 118 upon cathode 70 becoming energized, the valve 74 becomes momentarily conductive and a pulse of current is supplied to resistor 71a. This pulse increases the anode to cathode potential as regards cathode 66 and the glow will immediately transfer from cathode 70 to cathode 66, it being understood that the cathodes in the timer and in the function counter are arranged in a circle with respect to their common anode. Upon cathode 66 becoming energized a pulse is developed across the secondary winding 80 of transformer 78, the said winding being connected by conductor 83 to the grid 85 of the electric discharge device 84. The battery 82 normally maintains the electric discharge devices, namely, 84, 93, 100 and 108 in non-conducting state since the grids are held negative with respect to their cathodes. When the voltage pulse is delivered to grid 85 of the electric discharge device 84, the device is rendered momentarily conductive, and the voltage pulse is thus amplified and is then applied as a reset voltage pulse to the particular cathode of timer 12 to which the tap switch happens to be connected. The conductivity of 84 thus renders its particular dial switch member 126 operative for presetting the timer for a squeeze operation, during which the workpieces to be welded are forced into intimate contact.

At the end of the squeeze operation another electric pulse is delivered by the timer to the function counter, which progresses the glow from cathode 66 to cathode 67, causing the latter to become energized. The current flow in the cathode circuit thereof produces a voltage drop across resistor 86 which is accordingly transmitted as a signal voltage by the electric circuit means including the winding 89 and conductor 91. The signal voltage delivered to grid 92 of the electric discharge device 93 causes the device to become momentarily conductive. The momentary conduction of 93 resets the glow to the cathode to which dial switch 127 is connected for counting the welding time cycles. This next operation of the timer thus controls the duration of the weld period according to the setting of 127. At the end of this welding time period the function counter will receive another electric pulse which transfers the glow from cathode 67 to cathode 68. In a similar manner current flow in the cathode circuit thereof produces a voltage drop across resistor 94 so that a signal voltage is transmitted by the electric circuit means including secondary winding 97 and conductor 98 to grid 99 of electric discharge device 100. The said device 100 is now rendered momentarily conductive with the dial switch member 128 being rendered operative for presetting the timer. This operation of the timer therefore controls the duration of the holding period of the welding operation. At the end of this period another electric pulse is delivered to the function counter, stepping the glow from cathode 68 to cathode 69. The voltage drop across resistor 102 produces a signal voltage which is transmitted by conductor 106 to grid 107 of the electric discharge device 108. The momentary conduction 108 makes the dial switch member 130 operative for presetting the timer. This member controls the "off" time of the welding operation and following this period the several functions are repeated, all in a manner as is well known in the welding art.

For repeating the series of sequential operations it is necessary to switch the conductivity from cathode 70 to cathode 66. The electric circuit means associated with the cathode 70 is provided for this purpose. As the "off" period comes to an end the pulse delivered to the function counter steps the glow from cathode 69 to 70 and, as previously explained, a signal voltage is applied to discharge valve 74 which upon becoming conductive functions to increase the anode to cathode potential of the cathode 66, causing the glow to transfer from cathode 70 to 66, whereupon the timing of the several operations is repeated.

Each dial switch member includes a number of terminals such as 131, which are electrically connected to corresponding cathodes of the timer 12. Conductors are employed for this purpose, which, however, have been omitted from the drawings in the interest of clearness, since forty conductors would have to be shown for connecting the ten terminals of each dial switch member with the cathodes of the timer. Each dial switch member is provided with a pointer or tap switch such as 132 which can be set in contact with a particular terminal, depending on the desired number of electric pulses to be counted by the timer. Direct current battery 134 provides a source of current for energizing electric discharge devices 84, 93, 100 and 108, it being understood that the positive terminal of battery 134 is connected to conductor 15 and through the dial switch members and the pointers 132 thereof said positive terminal has connection with the anodes 135 of the electric devices 84, 93, 100 and 108. The negative terminal of battery 134 is connected by conductor 136 to conductor 120, which in turn has electrical connection with the cathode of each electric discharge device.

In operation of the timer 12 for timing the squeeze operation, for example, it will be assumed that the "off" period has just ended with the production of an electric pulse by the last cathode 1. The coupling circuit supplies this pulse to the function counter, with the result that cathode 70 is energized and a repeat operation is initiated, with the glow being transferred to cathode 66 of the function counter. In a manner as described the electric discharge device 84 is rendered conductive so that the dial switch member 126 is operative for presetting the timer in advance of the "squeeze" operation. For illustrative purposes the pointer 132 of member 126 is set at terminal 6, which terminal is electrically connected to cathode 6 of the timer. The above operations take place immediately upon the glow energizing cathode 1 of the timer and as a next current pulse is supplied to the timer the glow will leave cathode 1 and transfer to cathode 6 by reason of the presetting which has taken place through device 84 being rendered conductive. The next current pulse delivered to the timer transfers the glow from cathode 6 to cathode 5 and as each current pulse is received the same is counted for a total of six pulses by effecting successive energization of the cathode until cathode 1 is again reached. Another electric pulse is then transmitted by the coupling circuit to the function counter, the result of which is to energize cathode 67 so that electric discharge device 93 is rendered conductive. The pointer 132 of member 127 is set at terminal 8, which is in electrical connection with cathode 8 of the timer. As the glow leaves cathode 1 it jumps to cathode 8 by reason of the presetting which has been effected through conductivity of device 93. Thus for the welding period eight cathodes must be energized in succession, requiring eight current pulses and thus a definite time interval is provided for welding. The "hold" period will take place following the weld since the conductivity is switched from device 93 to device 100 and following the timing of this period the "off" period takes place in sequence, whereupon the entire series of operations is repeated unless the switch 75 is opened.

Figures 1 and 1A disclose two forms of stop control for terminating the counting operations of either or both the timer 12 and the function counter 62. As stated above, the series of operations and the particular timing of said operations are repeated as long as switch 75 remains closed. Upon opening the switch the counting operations come to a stop when the glow is transferred to cathode 70. Due to the open switch 75 the discharge valve 74 is not operative to transfer the glow to the cathode 66 and the counter remains in the "Off period" of operations. However, the supply of current pulses from the alternating current source to the timer 12 continues and the glow moves from cathode to cathode in the timer, in accordance with the setting of the "Off time" switch member 130. and then repeats. As a result when switch 75 is again closed the operator is not certain that a full "Off time" period will be counted before the "Squeeze" period begins.

The second form of stop control includes the electric discharge valve 32 and the conductor 138 which electrically connects the cathode 35 of said valve to the positive end of the resistor 102. By means of conductor 15 the grid 38 of said electric discharge valve is connected to the negative end of the resistor. With the switch 75 closed, and should the operator open switch 33, the timer and function counter will continue to operate until cathode 69 is energized, whereupon a hold-off pulse is supplied to valve 32, rendering the same nonconductive, and accordingly, the supply of current pulses to the timer 12 is stopped. When the switch 33 is again closed to repeat the counting functions for a new operation the timer will operate in a manner whereby a full "Off time" period is counted before the "Squeeze" period begins.

Figure 2:
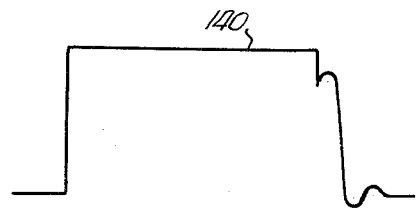
Figure 2 is an oscillograph illustrating the wave form of the voltage developed across one of the cathode resistors of the function counter during operation of the counter.

It will be understood that during operation the cathodes 66, 67, 68 and 69 of the function counter will remain energized for a period of time as determined by the setting of their particular dial switch member and during said periods a voltage will appear across the resistors in the cathode circuits respectively. A sequential action is thus obtained since cathode 66 remains conductive for six cycles as determined by the dial switch member 126 and a voltage thus appears across the resistor 71, 71a for this period of time. Then cathode 67 becomes conductive until a voltage appears across resistor 86 for eight cycles as determined by the setting of the dial switch member 127. Figure 2 is a graph illustrating the magnitude and other characteristics of the voltage 140 developed across said resistor 86. Similar action takes place with respect to resistors 94 and 102. These voltages may be applied to the controls of a machine required to be time controlled in sequence such as a welding machine. In this manner the various operations thereof can be accurately timed with the periods being definitely controlled and wherein the operator can preset the time periods for any number of cycles of alternating current from 1 to a maximum of 10, which is the limit as permitted by the illustrated embodiment. However, by the addition of another timer the maximum time interval may be increased to one hundred cycles.

Figure 3:
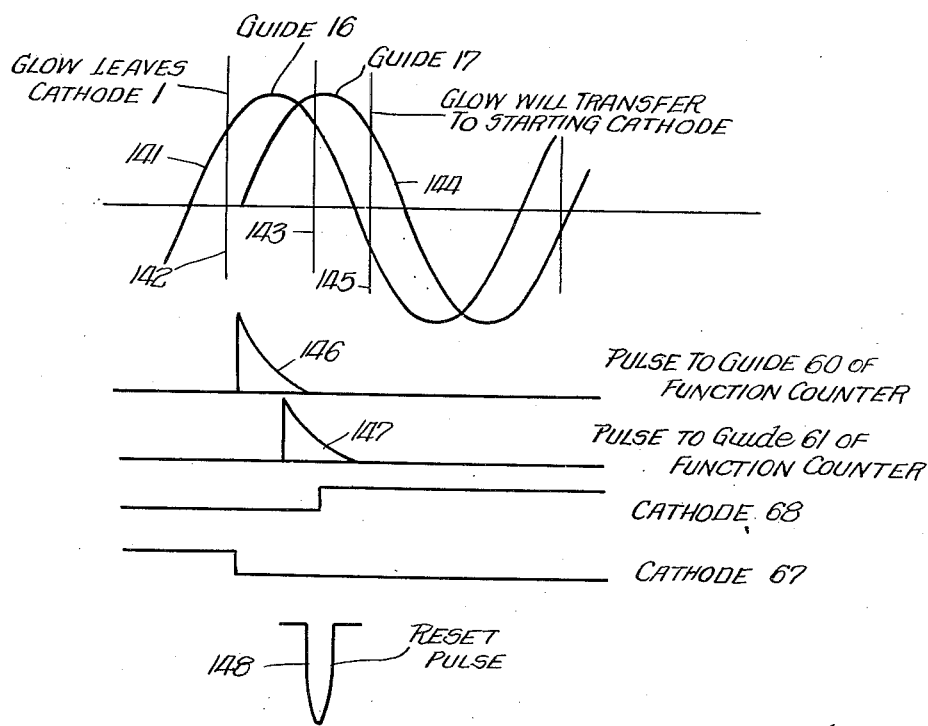
Figure 3 is a view illustrating diagrammatically by means of graphs the magnitude of the voltages developed between said components of the function counter during operation thereof.

Figure 3 illustrates by means of graphs the magnitude and sequence of the voltage pulses developed by certain components of the timer and the function counter. In the operation of the present electronic counting circuit it was explained that energization of cathode 1 of the timer, that is, the last cathode of this element, delivered an electric pulse to the function counter which stepped the glow from one cathode to the next cathode, thereby delivering a voltage pulse to one of the electronic devices, the same functioning to effect a resetting of the timer in advance of the glow being transferred from said last cathode 1 of the timer to whatever cathode may be selected by the resetting means. Figure 3 illustrates the above by means of graphs wherein an electric pulse from transformer 230 delivered to the timer 212 at AB is shown as displaced voltage waves of sinusoidal form such as appear on the guides 16 and 17 of the timer, respectively. The sinusoidal voltage wave 141 appears on guides 16 shortly after cathode 1, for example, becomes energized. At time 142 the glow will leave cathode 1 and transfer to guide 16 thereof with transference to guide 17 taking place at time 143 as a result of the sinusoidal voltage wave 144 appearing on said guide 17. This voltage wave is displaced with respect to wave 141 due to the phase shift circuit 22. At time 145 the glow will leave guide 17 and transfer to the starting cathode either 10, 9, 8, etc., whereupon a repeat operation of the timer takes place.

Upon cathode 1 becoming energized an electric pulse is supplied to the function counter which generates voltage pulses on the guides 60 and 61 of the function counter as described, the same being displaced due to the phase shift circuit 55. Numeral 146 indicates the voltage pulse appearing on guide 60 and numeral 147 indicates the displaced voltage pulse appearing on guide 61. The net result of the voltage pulses on the guides 60 and 61 is to transfer the glow from cathode 67, for example, to 68. Upon cathode 68 becoming energized the voltage developed across resistor 94 will produce a voltage pulse in the secondary winding of transformer 96.

This pulse has considerable magnitude and is of short duration, the same being indicated by numeral 148, Figure 3. Said voltage may be termed a "reset" pulse since it is transmitted by circuit means to one of the electronic devices to effect a resetting of the timer, all in a manner as previously described. However, by again referring to Figure 3, it will be understood that the timer is accordingly reset before the glow leaves the guide 17 of the timer. Accordingly, the glow is transferred to whatever cathode of the timer may be pre-selected by the setting of the particular dial switch member.

In Figure 4 the gas filled vacuum valve 350 and the switch 351 operate as a modified form of control for starting and stopping the counting operations of the present electronic counting circuit. This modified form of stop control has many of the same desirable characteristics as the switch and discharge valve for controlling the supply of current pulses to be counted, as shown in Figure 1. However, the said gas filled discharge valve 350 and switch 351 are outstanding in their simplicity as regards structure, mode of operation, and also the manner in which they supplement the operation of the grid controlled vacuum valve 308 in accomplishing their intended functions.

In Figure 4 the numeral 212 indicates the electronic timer and the numeral 262 indicates the electronic function counter, both of which are identical in construction and in mode of operation to the timer 12 and function counter 62 of Figure 1 and 1A. Said elements are also electrically connected by similar coupling means constituting the transformer 245 and the vacuum valve 250, whereby electric pulses from cathode 1 of the timer 212 are transmitted to the function counter 262. The electronic devices 284, 293, 300 and 308, and also their respective dial switch members, are the same as previously illustrated and described and these components of the present electronic counting circuit are electrically connected by similar circuit means, essentially consisting of the conductors 283, 291, 298 and 306, which respectively connect the grids of the electronic devices to certain transformers forming part of and contained within the function counter 262.

The electronic counting circuit of Figure 4 operates in a manner which is identical in all respects to that as described, the only difference residing in the operation of the stop control which is rendered operative or inoperative by closing and opening switch 351. Assuming that the electronic counting circuit of Figure 4 is operating and that switch 351 is now closed by the operator, operation of the circuit will continue until the glow is transferred from cathode 68 to cathode 69 of function counter 262. The reset pulse, which is accordingly transmitted from conductor 306 to grid 307 of the electronic device 308, will thus effect momentary conductivity of this electronic device. However, with switch 351 being closed the gas filled tube 350 simultaneously becomes conductive. It will be understood that tube 350 being a gas filled tube, its grid 352 has control until the tube is fired, after which the grid no longer controls conductivity of the same and the gas filled tube will conduct until switch 351 is opened. With the gas filled tube 350 conducting, the resetting function of the "Off time" electronic device is continuously operative and accordingly the glow is held at a particular cathode of the timer according to the setting of the dial switch member 330 thereof. When the switch 351 is opened the electronic counting circuit starts operation and a full "Off time" count takes place before the "Squeeze" period is initiated.

The invention is not to be limited to or by details of construction of the particular embodiment thereof illustrated by the drawings as various forms of the device will of course be apparent to those skilled in the art without departing from the spirit of the invention or the scope of the claims.

What is claimed is:

1. In a sequence timing system, the combination with a timing element, an electric source providing current pulses to be counted by the timing element, and a function counting element, of a coupling circuit for electrically coupling the function counting element to the timing element, whereby the signal voltage developed by the timing element at the completion of each timing operation thereof is transmitted to the function counting element as an electric pulse to be counted thereby, a plurality of electric devices related in number to the pulses to be counted by the function counting element and being electrically connected thereto, said electric devices each being individually energized by the function counting element as its respective pulse is counted thereby, presetting means in electrical association with each electric device, and connections between each presetting means and the timing element.

2. In a sequence timing system, the combination with a timing element, an electric source providing periodic current pulses to be counted by the timing element, and a function counting element, of a coupling circuit for electrically coupling the function counting element to the timing element, said coupling circuit receiving a signal voltage from the timing element at the completion of each timing operation thereof and transmitting the same to the function counting element as an electric pulse to be counted thereby, a plurality of electronic devices related in number to the pulses to be counted by the function counting element and being electrically connected thereto, each electronic device registering a pulse received by the function counting element by being individually energized as its respective pulse is counted by said element, whereby the energization is switched from one device to the next as the pulses are sequentially received and counted, presetting means for the timing element corresponding in number to the electronic devices and each being electrically connected to the timing element, and electrical connections joining each presetting means to its respective electronic device, whereby energization of an electronic device renders its particular presetting means operative.

3. In a sequence timing system, the combination with a timing element and a function counting element both of the type employing an anode and a plurality of cathodes with guide terminals located between the cathodes, of an electric current source adapted to supply current pulses to the guide terminals of the timing element to cause energization of the cathodes thereof in succession, whereby the pulses can be counted and whereby energization of the last cathode produces a signal voltage indicating the completion of a timing operation, a coupling circuit electrically connecting the last cathode of the timing element with the guide terminals of the function counting element, said coupling circuit transmitting said signal voltages to the function counting element as electric pulses to be counted thereby, a plurality of electronic devices related in number to the pulses to be counted by the function counting element, circuit means connecting each electronic device with a particular cathode of the function counting element, whereby energization of said cathodes as the electric pulses are received and counted thereby results in energization of their respective electronic device, presetting means for the timing element including a dial switch member for each electronic device having electrical connection therewith, and conductors connecting the cathodes of the timing element with each dial switch member.

4. In a sequence timing system, apparatus for counting electric current pulses by means of counting elements of the type employing an anode and a plurality of cathodes with guide terminals located between the cathodes, whereby current pulses applied to the guide terminals energize the cathodes in succession and can therefore be counted, of a first counting element providing a timer, a second counting element providing a function counter for the timer, a coupling circuit electrically connecting the last cathode of the timer with the guide terminals of the function counter, whereby the signal voltage developed by said last cathode at the completion of each timing operation is transmitted to the function counter as an electric pulse to be counted thereby, a plurality of electronic devices corresponding in number to the pulses to be counted by the function counter, circuit means connecting each electronic device with a particular cathode of the function counter, each circuit means transmitting an energizing current to its electronic device upon its cathode becoming energized as a pulse is received thereby, so that energization of the cathodes of the function counter in succession as the electric pulses are received thereby results in successive energization of the electronic devices, and presetting means for the timer capable of selecting a certain cathode of the timer for starting a timing operation and thus the number of current pulses to be counted for said timing operation, said presetting means including a switch member for each electronic device having electrical connection therewith and being operative for presetting the timer upon its respective electronic device becoming energized.

5. In a sequence timing system, apparatus for counting electric current pulses by means of counting elements of the type employing an anode and a plurality of cathodes with guide terminals located between the cathodes, whereby current pulses applied to the guide terminals energize the cathodes in succession and can therefore be counted, of a first counting element providing a timer, a second counting element providing a function counter for the timer, a coupling circuit connecting the last cathode of the timer with the guide terminals of the function counter, a resistor in the circuit of said last cathode for producing a signal voltage upon current flow in the cathode circuit when said last cathode is energized, said coupling circuit having electrical association with the resistor whereby said signal voltage is transmitted to the function counter as an electric pulse to be counted thereby, a plurality of electronic devices corresponding in number to the pulses to be counted by the function counter, circuit means electrically connecting each electronic device with a particular cathode of the function counter, a resistor in the circuit of each said particular cathode having circuit relation with the circuit means thereof, each resistor producing a voltage upon current flow when the cathode thereof is energized, whereby each circuit means transmits an energizing current to its electronic device upon its cathode becoming energized as a pulse is received thereby, so that energization of the cathodes of the function counter in succession as the electric pulses are received thereby results in successive energization of the electronic devices, and presetting means for the timer capable of selecting a certain cathode of the timer for starting a timing operation and thus the number of current pulses to be counted for said timing operation, said presetting means including a switch member for each electronic device having electrical connection therewith and being operative for presetting the timer upon its respective electronic device becoming energized.

6. In a sequence timing system as defined by claim 5, wherein the electronic devices each comprise a grid controlled electric discharge valve with the grid thereof being electrically connected by the circuit means to its particular cathode resistor of the function counter, and wherein the presetting means for each electronic device comprises a dial switch member having a plurality of terminals equal in number to the cathodes of the timer, and conductors connecting said cathodes to the terminals respectively of each dial switch member.

7. In a sequence timing system as defined by claim 5, wherein the function counter additionally includes repeat means for effecting a re-energization of the cathodes of the function counter in the same sequence as previously took place, said repeat means including an electric discharge valve having its grid and cathode electrically connected across the resistor of the last cathode of the function counter and having its anode electrically connecting to another of the cathode resistors of the function counter, and said repeat means being triggered to effect a repeating operation by the next electric pulse received by the function counter following energization of the last of said particular cathodes.

8. An electrical system for counting periodic current pulses for the accurate timing of a plurality of functions taking place in sequence, the combination with a first counting element providing a timer and a second counting element providing a function counter for the timer, of a coupling circuit electrically connecting the function counter to the timer, a plurality of electric discharge devices of the grid controlled type, presetting means for each electric discharge device for respectively presetting the timer according to the setting of the particular means operative at the time, a direct current source for energizing the timer rendering the same operative for counting a number of current pulses, means provided in association with the timer for developing an electric pulse at the end of each timing operation and which is transmitted by the coupling circuit to the function counter, a direct current source for energizing the function counter rendering the same operative for counting the electric pulses, electric circuit means for effecting conductivity of the electric discharge devices, said circuit means corresponding in number to the discharge devices and having electrical relation with the function counter, said electric circuit means being energized in sequence as the electric pulses are received by the function counter to respectively produce signal voltages, and said electric circuit means each including conductors electrically connecting the same to their respective discharge device for transmitting to the discharge device the signal voltage produced thereby, whereby the electric discharge devices are each rendered conductive in turn for rendering its particular presetting means operative so that the timer will count a number of current pulses as determined by the setting of the operative presetting means.

9. An electric system for counting periodic current pulses for the accurate timing of a plurality of functions taking place in sequence, the combination with a first counting element providing a timer and a second counting element providing a function counter for the timer, of a coupling circuit electrically connecting the function counter to the timer, a plurality of electric discharge devices having an anode, a cathode and a control grid, presetting means in the form of a dial switch member for each electric discharge device and being electrically connected to the anode thereof, said dial switch members being effective to respectively preset the timer according to the setting of the particular member operative at the time, a direct current source for energizing the timer rendering the same operative for counting a number of current pulses, means provided in association with the timer for producing an electric pulse at the end of each timing operation and which is transmitted by the coupling circuit to the function counter, a direct current source for energizing the function counter rendering the same operative for counting the electric pulses, electric circuit means corresponding in number to the electric discharge devices and having electrical relation with the function counter, said electric circuit means being energized in sequence as the electric pulses are received by the function counter to respectively produce signal voltages, a source of biasing voltage for normally maintaining the electric discharge devices in a non-conducting state, and said electric circuit means each including conductors connecting the same with the grid and cathode of their respective discharge device for transmitting to the discharge device the signal voltage produced by the said circuit means, whereby the electric discharge devices are each rendered conductive in turn for rendering its particular dial switch member operative so that the timer will count a number of current pulses as determined by the setting of the operative dial switch member.

10. An electrical system as defined by claim 8, wherein the function counter additionally includes repeat means for effecting a re-energization of the electric circuit means in the same sequence as previously took place, said repeat means having electrical association with one of said electric circuit means and being triggered to effect a repeating operation by the next electric pulse received by the function counter following the energization of the last electric circuit means.

11. In a sequence timing system, the combination with a timing element and a function counting element both of the type employing an anode and a plurality of cathodes with guide terminals located between the cathodes, of an electric current source adapted to supply current pulses to the guide terminals of the timing element to cause energization of the cathodes thereof in succession, whereby the current pulses can be counted, electrical means in connected relation with the last cathode of the timing element for developing a signal voltage upon energization of said last cathode, thus indicating the completion of a timing operation, a coupling circuit connecting the said electrical means with the guide terminals of the function counting element, said coupling circuit transmitting the signal voltages to the function counting element as electric pulses which energize the cathodes of the function counting element in succession and are thus counted thereby, presetting means for the timing element including dial switch members corresponding in number to the pulses to be counted by the function counting element, circuit means respectively connecting each dial switch member with a particular cathode of the function counting element, whereby energization of said cathodes as the electric pulses are received and counted thereby results in energization of their respective dial switch member, and conductors connecting the cathodes of the timing element with each dial switch member.

12. In a sequence timing system, apparatus for counting electric current pulses by means of counting elements of the type employing an anode and a plurality of cathodes with guide terminals located between the cathodes, whereby current pulses applied to the guide terminals energize the cathodes in succession and can therefore be counted, of a first counting element providing a timer, a second counting element providing a function counter for the timer, a coupling circuit electrically connecting the last cathode of the timer with the guide terminals of the function counter, whereby a signal voltage developed by said last cathode at the completion of each timing operation is transmitted to the function counter as an electric pulse to be counted thereby, a plurality of presetting means for the timer and which correspond in number to the pulses to be counted by the function counter, circuit means respectively connecting each presetting means with a particular cathode of the function counter, each circuit means transmitting an energizing current to its presetting means upon its cathode becoming energized as an electric pulse is received thereby, so that energization of the cathodes of the function counter in succession as the electric pulses are received thereby results in successive energization of the presetting means, and said presetting means each including a switch member providing a plurality of terminals having electrical connection with the cathodes respectively of the timing element, and a manually positionable tap switch for each switch member adapted to electrically connect a particular terminal thereof with the circuit means in electrical connection with the switch member.

13. An electric system for counting periodic current pulses for the accurate timing of a plurality of functions taking place in sequence, the combination with a first counting element including a plurality of cathodes and providing a timer and a second counting element also including a plurality of cathodes and providing a function counter for the timer, a direct current source for energizing the timer rendering the same operative for counting a number of current pulses to thereby time an operation, of electrical means in circuit with the last cathode of the timer for developing an electric pulse at the end of each timing operation, a coupling circuit between the electrical means and the function counter for transmitting the electric pulses to the said function counter, a plurality of presetting switch members for the timer in the form of dial switch members each having terminals equal in number to the cathodes of the timer, said dial switch members being effective to respectively preset the timer according to the setting of the particular member operative at the time, electric circuit means in connected relation respectively with certain cathodes of the function counter, each said electric circuit means connecting its particular cathode to one of said presetting switch means, said electric circuit means each producing a signal voltage upon its respective cathode becoming energized as the electric pulse transmitted by the coupling circuit is received and counted thereby, and conductors electrically connecting the cathodes of the timer with the terminals respectively of each presetting switch means, whereby energization of the cathodes of the function counter in succession as the electric pulses are received thereby results in signal voltages being supplied to the presetting switch means in succession to energize the same one at a time for effecting a presetting of the timer.

References Cited in the file of this patent

UNITED STATES PATENTS

| | | |
|---|---|---|
| 2,413,440 | Farrington | Dec. 31, 1946 |
| 2,422,698 | Miller | June 24, 1947 |
| 2,575,517 | Hagen | Nov. 20, 1951 |
| 2,607,891 | Townsend | Aug. 19, 1952 |